US011973796B2

(12) United States Patent
Weizman et al.

(10) Patent No.: US 11,973,796 B2
(45) Date of Patent: Apr. 30, 2024

(54) DANGLING DOMAIN DETECTION AND ACCESS MITIGATION

(71) Applicant: Microsoft Technology Licensing, LLC, Redmond, WA (US)

(72) Inventors: Josef Weizman, Haifa (IL); Aharon Naftali Michaels, Beit Shemesh (IL); Ram Haim Pliskin, Rishon Lezion (IL); Dotan Patrich, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 17/223,174

(22) Filed: Apr. 6, 2021

(65) Prior Publication Data
US 2022/0321596 A1    Oct. 6, 2022

(51) Int. Cl.
*H04L 9/40*    (2022.01)
*H04L 61/4511*    (2022.01)

(52) U.S. Cl.
CPC ...... *H04L 63/1441* (2013.01); *H04L 61/4511* (2022.05); *H04L 63/1408* (2013.01)

(58) Field of Classification Search
CPC ............. H04L 63/1441; H04L 61/4511; H04L 63/1408; H04L 63/1466; H04L 63/1483; H04L 63/1425
See application file for complete search history.

(56) References Cited

U.S. PATENT DOCUMENTS

| 11,088,993 B2* | 8/2021 | Wardell | H04L 67/563 |
| 2002/0091703 A1* | 7/2002 | Bayles | H04L 61/45 |
| 2002/0091827 A1* | 7/2002 | King | H04L 61/00 |
| | | | 709/217 |

(Continued)

FOREIGN PATENT DOCUMENTS

EP    3188453 A1    7/2017

OTHER PUBLICATIONS

Liu, et al., "All Your DNS Records Point to Us Understanding the Security Threats of Dangling DNS Records", In Proceedings of the ACM SIGSAC Conference on Computer and Communications Security, Oct. 24, 2016, pp. 1414-1425.

(Continued)

*Primary Examiner* — Ali S Abyaneh
(74) *Attorney, Agent, or Firm* — Ogilvie Law Firm

(57) ABSTRACT

Embodiments detect risky situations in which a domain name record remains viable after the target it identified is not. Such dangling records create various risks because substitute targets, such as fraudulent websites, may be installed without the knowledge of the original target's owner. By obtaining and correlating data from multiple tenants, a cloud service provider detects dangling structures and any attempts to exploit them. Dangling records may specify a custom domain name, for example, or a static IP address that can be misused. In response, the provider's security infrastructure can alert the original target's owner, block the attempted exploit, or otherwise mitigate the risks. Traffic monitoring, control plane API invocations, and domain name server queries may be employed by the security infrastructure to detect resource deletion, resource creation, and resource access attempts that correspond with vulnerable records or suspect activity involving them.

20 Claims, 4 Drawing Sheets

(56) References Cited

U.S. PATENT DOCUMENTS

| | | | |
|---|---|---|---|
| 2007/0192493 A1* | 8/2007 | Manolache | H04L 61/30 709/226 |
| 2008/0028450 A1* | 1/2008 | Zhao | H04L 67/306 726/6 |
| 2009/0094666 A1* | 4/2009 | Cao | H04L 63/20 726/1 |
| 2012/0265748 A1 | 10/2012 | Simpson | |
| 2014/0258542 A1 | 9/2014 | Young et al. | |
| 2016/0360557 A1 | 12/2016 | Lavi et al. | |
| 2017/0195285 A1* | 7/2017 | Kakhki | H04L 61/4511 |
| 2018/0124073 A1 | 5/2018 | Scherman et al. | |
| 2018/0198796 A1* | 7/2018 | Chien | H04L 61/5007 |
| 2018/0248893 A1 | 8/2018 | Israel et al. | |
| 2018/0302430 A1 | 10/2018 | Israel et al. | |
| 2018/0324193 A1 | 11/2018 | Ronen et al. | |
| 2018/0351783 A1 | 12/2018 | Patrich et al. | |
| 2019/0005225 A1 | 1/2019 | Patrich et al. | |
| 2019/0215330 A1 | 7/2019 | Neuvirth et al. | |
| 2019/0278922 A1 | 9/2019 | Levin et al. | |
| 2019/0281064 A1 | 9/2019 | Patrich et al. | |
| 2019/0306178 A1 | 10/2019 | Weizman et al. | |
| 2020/0014697 A1 | 1/2020 | Karin et al. | |
| 2020/0044911 A1 | 2/2020 | Kliger et al. | |
| 2020/0045075 A1 | 2/2020 | Kliger et al. | |
| 2020/0053090 A1 | 2/2020 | Kliger et al. | |
| 2020/0053119 A1* | 2/2020 | Schnieders | G06V 10/761 |
| 2020/0053123 A1 | 2/2020 | Pliskin et al. | |
| 2020/0057953 A1 | 2/2020 | Livny et al. | |
| 2020/0067980 A1 | 2/2020 | Livny et al. | |
| 2020/0151326 A1 | 5/2020 | Patrich et al. | |
| 2020/0233961 A1 | 7/2020 | Wolfin et al. | |
| 2020/0252417 A1 | 8/2020 | Neuvirth et al. | |
| 2020/0314119 A1 | 10/2020 | Karin et al. | |
| 2020/0409942 A1* | 12/2020 | Kasimov | H04L 63/10 |
| 2022/0124069 A1* | 4/2022 | Chiu | H04L 63/0263 |
| 2022/0141226 A1* | 5/2022 | Obispo Semidey | H04L 63/101 726/3 |

OTHER PUBLICATIONS

"International Search Report and Written Opinion Issued in PCT Application No. PCT/US22/022231", dated Jun. 20, 2022, 12 Pages.

Ram Pliskin, "Azure Security Center can identify attacks targeting Azure App Service applications", retrieved from <<https://azure.microsoft.com/en-us/blog/azure-security-center-can-identify-attacks-targeting-azure-app-service-applications/>>, May 31, 2018, 6 pages.

Yossi Weizman, "Detecting threats targeting containers with Azure Security Center", retrieved from <<https://azure.microsoft.com/en-us/blog/detecting-threats-targeting-containers-with-azure-security-center/>>, Apr. 22, 2019, 14 pages.

"Host-based intrusion detection system", retrieved from <<https://en.wikipedia.org/wiki/Host-based_intrusion_detection_system>>, Feb. 16, 2019, 4 pages.

"CNAME record", retrieved from <<https://en.wikipedia.org/wiki/CNAME_record>>, Feb. 16, 2021, 4 pages.

"Dangling pointer", retrieved from <<https://en.wikipedia.org/wiki/Dangling_pointer>>, Jan. 24, 2021, 6 pages.

"Internet hosting service", retrieved from <<https://en.wikipedia.org/wiki/Internet_hosting_service>>, Feb. 20, 2021, 3 pages.

"Cloud computing", retrieved from <<https://en.wikipedia.org/wiki/Cloud_computing>>, Feb. 20, 2021, 25 pages.

"Prevent dangling DNS entries and avoid subdomain takeover", retrieved from <<https://docs.microsoft.com/en-us/azure/security/fundamentals/subdomain-takeover>>, Feb. 4, 2021, 9 pages.

* cited by examiner

EXAMPLE RISK MITIGATION METHODS 800, 900 FOR MITIGATING RISK FROM DANGLING NETWORK NAVIGATION DATA STRUCTURES

DANGLING DOMAIN DETECTION AND ACCESS MITIGATION

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, various tools that scan networks and applications for vulnerabilities are known. For example, scanning tools may determine which version of server software is running, and then compare version information to information about known vulnerabilities. Vulnerability scanners may also detect open ports, expired or missing digital certificates, and other host information that may be useful in an attack. However, improvements are still possible in the field of cybersecurity.

SUMMARY

A provider such as a cloud service provider or an internet service provider has visibility into activity by multiple customers, e.g., multiple cloud tenants. Some embodiments taught herein use provider-level combinations of information from two or more tenants to identify risks or risk exploits that are not detectable using only a single tenant's visibility. In particular, some embodiments detect an actual or impending relinquishment of a navigational resource by one tenant in conjunction with an acquisition or spoofing of the resource by another tenant, which together create a reputational or other risk to the first tenant. Such risk occurs, for instance, when a tenant X relinquishes a website that is identified by a custom domain name and a tenant Y substitutes different website content to be accessed at the same custom domain name.

Some embodiments use or provide a hardware and software combination which is configured to mitigate cybersecurity risk from dangling network navigation data structures by using provider-level visibility in a cloud architecture which has a provider-tenant-user hierarchy. The combination includes a digital memory, and a processor which is in operable communication with the memory. The processor is configured, e.g., by tailored software, to perform cybersecurity risk mitigation steps, which include (a) ascertaining that a network navigation data structure has been associated with a first tenant of the cloud architecture, the network navigation data structure having a target identifier which identifies a network navigation target, (b) determining that the network navigation target has been relinquished by the first tenant or has been submitted for relinquishment by the first tenant, and (c) establishing that a second tenant of the cloud architecture has performed a suspect activity which includes creating, attempting to control, controlling, or otherwise using at least one of the following: the network navigation data structure, any data structure which contains the target identifier, or a substitute target which is identified by the target identifier.

Some embodiments provide or use a method for mitigating cybersecurity risk from dangling network navigation data structures in an architecture which has a provider-tenant-user hierarchy, including: ascertaining that a network navigation data structure has been associated with a first tenant of the architecture, the network navigation data structure having a target identifier which identifies a network navigation target; determining that the network navigation target has been relinquished by the first tenant or has been submitted for relinquishment by the first tenant; establishing that a second tenant of the architecture has performed a suspect activity which includes creating, attempting to control, controlling, or otherwise using at least one of the following: the network navigation data structure, any data structure which contains the target identifier, or a substitute target which is identified by the target identifier; and mitigating a cybersecurity risk to the first tenant that is posed by the suspect activity of the second tenant.

Some embodiments provide or use a computer-readable storage device configured with data and instructions which upon execution by a processor cause a computing system to perform a method for mitigating cybersecurity risk from dangling network navigation data structures in a cloud architecture which has a provider-tenant-user hierarchy. The method includes: ascertaining that a network navigation data structure has been associated exclusively with a first tenant of the cloud architecture, the network navigation data structure having a target identifier which identifies a network navigation target in the cloud architecture; establishing that a second tenant of the cloud architecture subsequently performed a suspect activity which includes using the target identifier in the cloud architecture or attempting to use the target identifier in the cloud architecture, or both; and mitigating a cybersecurity risk to the first tenant that is posed by the suspect activity of the second tenant.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
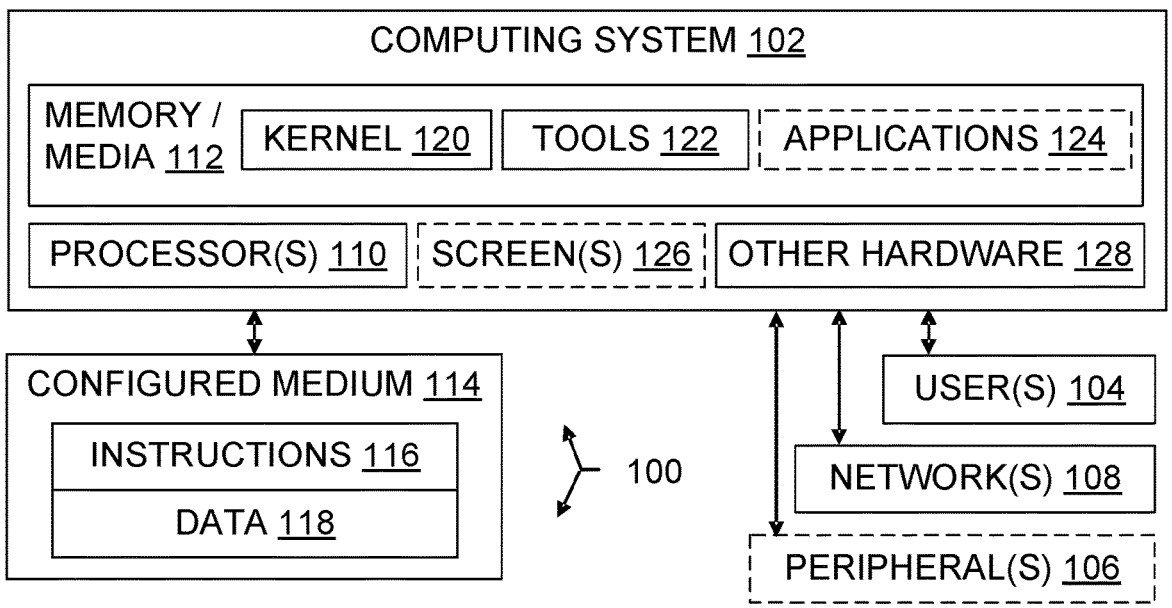
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by a perspective change realized by innovators working to improve the security of Microsoft cloud computing environments.

In a typical cybersecurity perspective, using another organization's data, or tracking activity by another organization, is discouraged (and may be illegal). Some exceptions include partner organizations, industry associations, and public sources of data. A manufacturer often makes legitimate use of some confidential information from its suppliers or its customers, for example, and any member of an industry may make legitimate use of confidential information and activity summaries from trade associations or regulatory clearinghouses, for example.

But normally it is not expected or permitted for one tenant of a cloud to benefit directly from internal information of another tenant of that cloud, when the only apparent relationship between the two tenants is that they happen to have the same cloud service provider. Accordingly, cybersecurity tools, including tools for identifying vulnerabilities in a tenant X configuration, have been limited to the identification of vulnerabilities using only confidential data of that tenant X or using public data; confidential data of other tenants has not been relied on.

Cloud service providers necessarily have some visibility into the activities of each individual tenant. But normally that visibility is used only for purposes specific to that tenant, e.g., to prepare bills for services rendered to that tenant, or to monitor each party's compliance with a Service Level Agreement between the provider and that tenant.

Some embodiments described herein stem from an insight that provider-level visibility could be beneficially and properly used in additional ways. In particular, by changing perspective and then combining information about navigational structures and targets that is gleaned from different tenants, some embodiments can detect navigational vulnerabilities, and some can mitigate exploits of such vulnerabilities.

For example, suppose a tenant X has a website W1 that is targeted by (identified by or accessed using) a subdomain D. Having done what it wanted with W1, or having decided to take a different approach that does not require W1, tenant X then deletes W1. However, through an error or an oversight, X does not disable subdomain D. A tenant Y discovers the continued viability of subdomain D, and (as a bad act) creates a website W2 that is also targeted by subdomain D. W2 could be a fraudulent website designed to steal user login information and personal information, for instance, or W2 could depict X as having positions or opinions that X does not actually have. To the extent that W2 is seen as being authorized by X or even allowed by X's negligence, when W2 was not actually authorized by X but was instead installed maliciously by Y, the substitute website W2 would accordingly pose a reputational, financial, legal, or other risk to X, in addition to the risks that W2 poses to end users.

Under a conventional provider perspective, these activities by the two tenants X and Y may be logged, e.g., for billing purposes. But the activities would have no apparent cybersecurity significance as a combination; they would not be linked together in a risk analysis.

Under a conventional tenant perspective, tenant X lacks any prompt knowledge of tenant Y's malicious activity. Actions by other tenants are outside the authorized visibility of any given tenant. X might only discover the substitution of W2 in place of W1 after a deceived user accuses X of fraud, or after an angry user wants to know why X has now taken the public position espoused in W2.

Accordingly, one emergent technical challenge of increasing security through enhanced use of provider visibility into tenant data is determining which tenant activity and which data supports risk mitigation. This challenge is met in part by focusing here on the mitigation of risks from dangling navigation data structures, e.g., custom domain names and static IP addresses, that can be misused, and by focusing on their navigation targets, e.g., websites, web applications, and so on.

Only a small amount of the potentially or actually available data about tenant configurations and activities is used in a given embodiment. Most tenant-specific data is not used by present embodiments, even when it is implicated in other aspects of cybersecurity. For example, tenant-specific data in general may include product specifications, databases, source code, financial documents, text documents, videos, virtual machines, and many other kinds of confidential data 118. Most if not all of these data are subject to malware infection or are at risk of unauthorized exfiltration, for example, but they are not directly relevant to the particular cybersecurity teachings herein, which involve provider-level visibility into dangling navigational structures and the risks attendant to them.

Another technical challenge is how to automatically detect activity that is suspect. On its own, for example, the creation of a website is typically a benign event. It becomes suspect only when context is obtained that makes it suspect, e.g., when the created website is targeted by an identifier relinquished by another tenant. This technical challenge is met by specifying certain combinations of tenant activity and configurational context, and by utilizing cloud control plane APIs or other provider-level management tools to monitor for these combinations.

By having visibility into both tenant's data—an original tenant that had a website resource and another tenant creating the website after the domain became dangling—an embodiment may use such data (e.g., an IP address of an account which created the website, an identity of a tool used to deploy the website, a comparison of site content, etc.) to distinguish between a malicious website and a benign website. There may be cases where a website is moved to another tenant for legitimate reasons, e.g., when both tenants belong to the same organization, so the embodiment may be equipped and configured to exclude such cases from raising an alert when apparent malice is not found.

The foregoing examples and scenarios are not comprehensive. Other scenarios, technical challenges, and innovations will be apparent to one of skill upon reading the full disclosure herein.

Before continuing, however, the reader is requested to note that a primary purpose of this disclosure is to describe the technology involved. It is understood that any use of any confidential data of a given tenant as discussed herein is to be pursuant to, or otherwise in compliance, with all applicable laws, regulations, service contracts, and other legal constraints. The teachings herein are not meant to promote or permit any improper or illegal use of activity tracking data, tenant configuration data, digital resource ownership data, or other tenant-specific data. Moreover, the provider's use of tenant-specific data as discussed herein is understood to be limited to a scope that is sufficient to implement the risk mitigations taught herein; use for any other purpose is neither suggested nor condoned by or through this disclosure.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, functionality for mitigating cybersecurity risk from dangling navigational structures could be installed on an air gapped network such as a highly secure cloud, and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
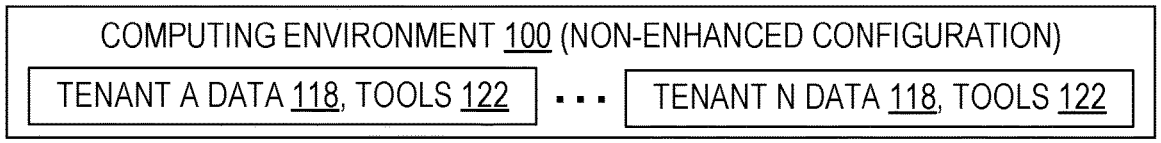
FIG. 2 is a block diagram illustrating aspects of a computing environment which lacks the enhancements taught herein.

FIG. 2 illustrates a computing environment 100 that lacks the risk mitigation enhancements taught herein. The computing environment 100 is a multi-tenant computing environment in which data 118 and tools 122 (including cybersecurity tools 122) reside for each of two or more respective tenants.

Figure 3:
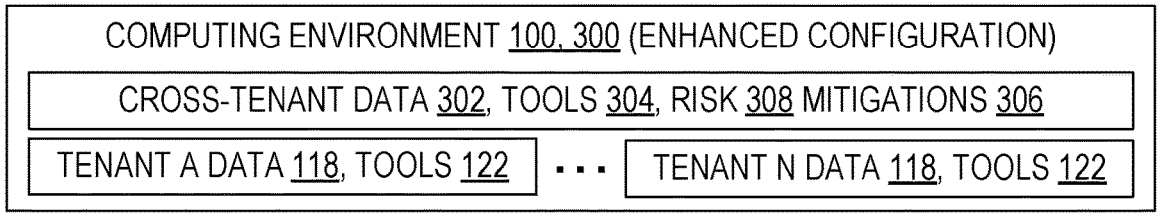
FIG. 3 is a block diagram illustrating aspects of a computing environment which is enhanced according to one or more approaches taught herein, such as risk mitigation using tools that detect suspicious activity based on data from multiple tenants.

FIG. 3 illustrates an enhanced computing environment 300 that is configured by one or more of the risk mitigation enhancements taught herein. This enhanced computing environment 300 may be a single machine shared by different tenants, but it is expected that an environment 300 will more often include a local network of machines, a datacenter, a cloud, or another multi-machine multi-tenant computing environment 300 that is enhanced to perform mitigation of risks from dangling navigational structures as taught herein. In addition to the data 118 and tools 122 found in non-enhanced environments 100, the enhanced computing environment 300 includes cross-tenant data 302, enhanced tools 304, and one or more specific procedures, policies, enhanced security controls, or other mitigations 306 taught herein of the risks 308 that arise from dangling navigational structures.

Figure 4:
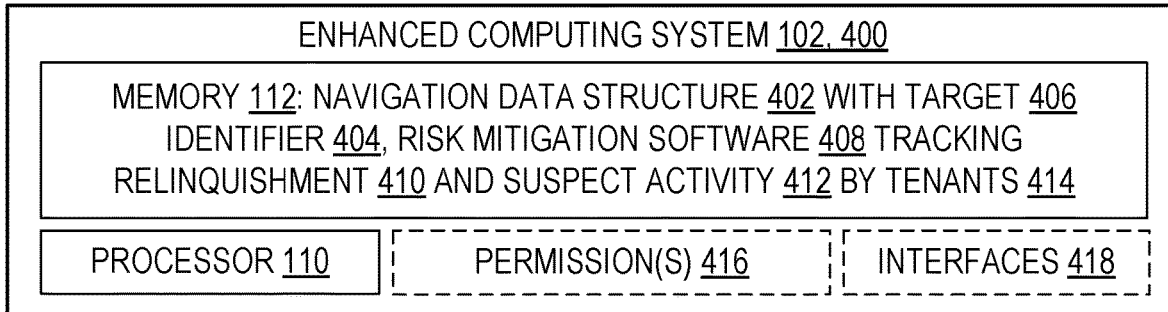
FIG. 4 is a block diagram illustrating an enhanced system configured with functionality for mitigating cybersecurity risk that arises from dangling network navigation data structures.

FIG. 4 illustrates a particular enhanced computing system 400 which may reside in an enhanced computing environment 300. The system 400 memory 112 is configured by a navigation data structure 402 which has a target identifier 404 identifying a navigation target 406. The system 400 memory 112 is also configured by risk mitigation software 408 which tracks navigation data structure relinquishment 410 activity and status, and also tracks suspect activity 412 by tenants 414 that involves or affects a navigation data structure 402. More generally, software 408 may perform a risk mitigation method illustrated in any one or more of FIGS. 8 through 10.

The tracking operations and the other mitigation data and operations performed by system 400 are authorized under, compliant with, and pursuant to, a Service Level Agreement, regulatory requirement, legal requirement, service contract, or other permission(s) 416. The permission(s) 416 pertain to the system 400, but they do not necessarily reside within the system 400 as artifacts.

The enhanced system 400 may be networked through one or more interfaces 418. An interface 418 may include hardware such as network interface cards, software such as network stacks, APIs, or sockets, combination items such as network connections, or a combination thereof.

Figure 5:
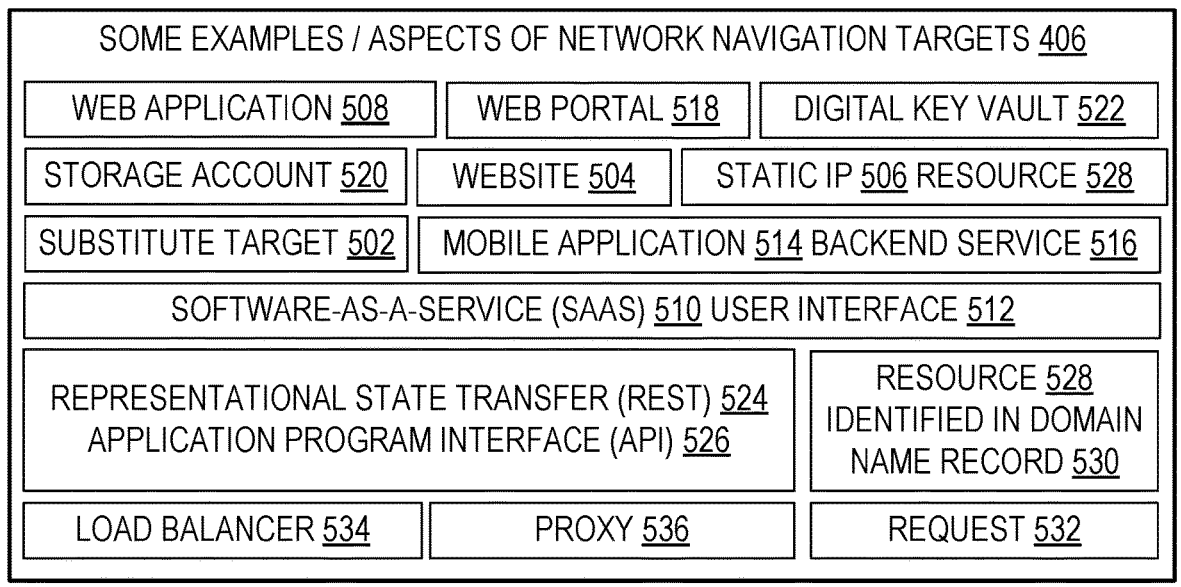
FIG. 5 is a block diagram illustrating some examples and other aspects of network navigation targets.

FIG. 5 shows some examples or aspects of network navigation targets 406. This is not necessarily a comprehensive list. These items and other network navigation targets 406 and their aspects relevant to risk mitigation are discussed at various points herein, and additional details regarding them are provided in the discussion of a List of Reference Numerals later in this disclosure document.

Figure 6:
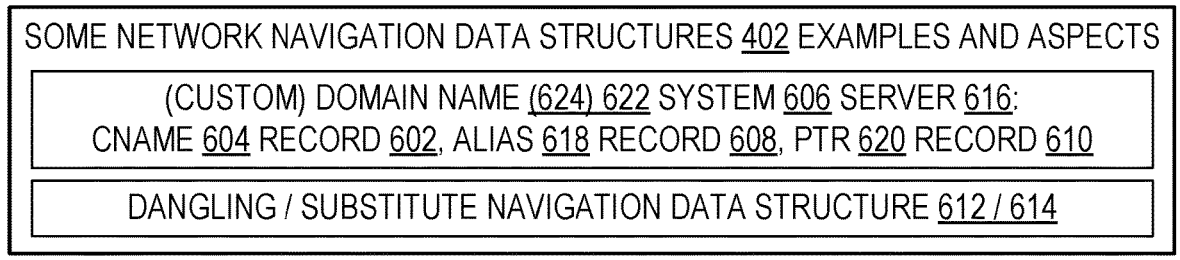
FIG. 6 is a block diagram illustrating some examples of network navigation data structures.

FIG. 6 shows some examples or aspects of network navigation data structures 402. This is not necessarily a comprehensive list. These items and other network navigation data structures 402 and their aspects relevant to risk mitigation are discussed at various points herein, and additional details regarding them are provided in the discussion of a List of Reference Numerals later in this disclosure document.

Figure 7:
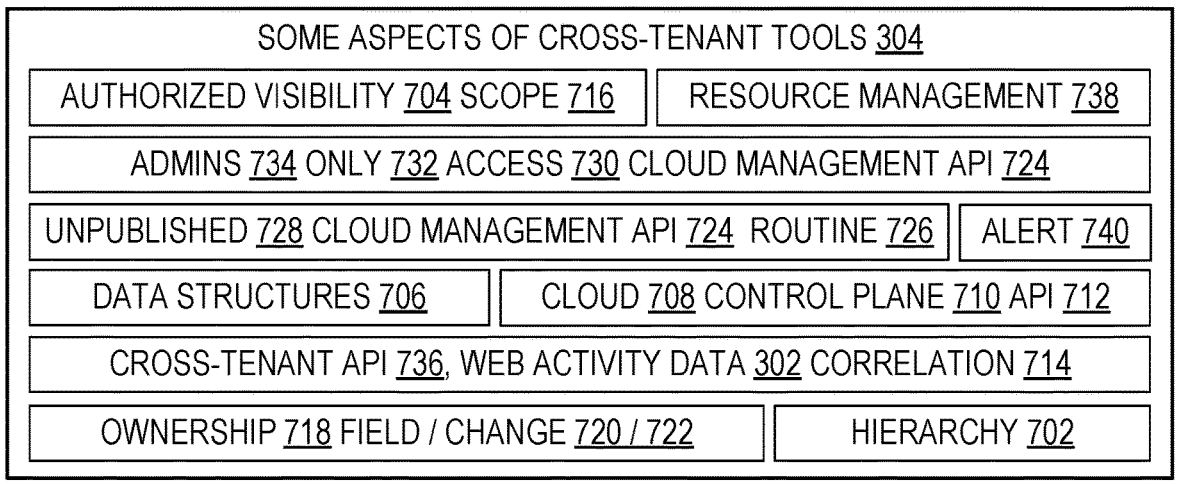
FIG. 7 is a block diagram illustrating some aspects of cross-tenant cybersecurity tools.

FIG. 7 shows some examples or aspects of cross-tenant risk mitigation tools 304. This is not necessarily a comprehensive list. These items and other risk mitigation tools 304, 122 and some of their aspects relevant to risk mitigation are discussed at various points herein, and additional details regarding them are provided in the discussion of a List of Reference Numerals later in this disclosure document.

Some embodiments use or provide a functionality-enhanced system, such as system 400 or another system 102 that is enhanced as taught herein. In some embodiments, an enhanced system which is configured for risk mitigation includes a digital memory 112, and a processor 110 in operable communication with the memory. The computing system is configured to mitigate cybersecurity risk from dangling network navigation data structures 402 by using provider-level visibility 704 in a cloud architecture 100 which has a provider-tenant-user hierarchy 702. The processor 110 is configured to perform cybersecurity risk mitigation steps. A "cybersecurity risk" includes, e.g., risk to data confidentiality, data integrity, data availability, privacy, or compliance with regulations or policy. As noted elsewhere herein, digital memory 112 may be volatile or nonvolatile or a mix.

In this embodiment, the risk mitigation steps include (a) ascertaining 802 that a network navigation data structure 402 has been associated 804 with a first tenant 414 of the cloud architecture, the network navigation data structure having a target identifier 404 which identifies 1014 a network navigation target 406, (b) determining 806 that the network navigation target has been relinquished 808 by the first tenant or has been submitted 810 for relinquishment by the first tenant, and (c) establishing 812 that a second tenant 414 of the cloud architecture has performed 814 a suspect activity 412 which includes creating 1006, attempting 1008 to control 1010, controlling 1010, or otherwise using 1012 at least one of the following: the network navigation data structure 402, any data structure 706 which contains the target identifier 404, or a substitute target 502 which is identified 1014 by the target identifier.

In this example, the target identifier 404 may be a custom domain name or a static IP address. For instance, as part of the ascertaining 802 the system 400 may learn that a particular CNAME record 602 or static IP address 506 goes with the first tenant. The CNAME record and the static IP record are examples of a network navigation data structure 402. A website 504 at a custom domain name 624 or at a static IP 506 is an example of a network navigation target 406. A custom domain name 624 or a static IP 506 is an example of a target identifier 404. A custom domain name 624 is sometimes referred to in the industry as an "alternate domain name", "custom domain", "alternate domain", or "subdomain".

In this example, as part of determining 806 a relinquishment status, the system 400 may determine that the first tenant 414 has let go of the network navigation target 406 or is about to let it go. Risk 308 then occurs when the network navigation data structure 402 which identifies that same target 406 is still around and could be misused.

In this example, as part of the establishing 812, the system 400 may establish that the second tenant performed a suspect activity. For instance, the custom domain name or static IP can be grabbed by the second tenant. A data structure 706 which contains the target identifier includes, e.g., the original CNAME record 602 or any other DNS 606 record (e.g., alias record 608) that uses the same custom domain name as the original CNAME record.

Some embodiments also actively or proactively mitigate 816 a cybersecurity risk to the first tenant that is posed by the suspect activity of the second tenant. For instance, an embodiment may alert 1056 an administrator or a tool 122 such as a SIEM, may block 1058 access to the substitute data structure or to usage of the target identifier, may increase 1060 authentication or authorization requirements 1062 associated with items 404 or 406 or both, or may perform a combination of such mitigations.

Some embodiments leverage cloud 708 service provider visibility 704 across multiple tenants 414. Although a given tenant may detect and remove their own dangling structures, it would not be able to detect exploitation by another tenant. But in some embodiments, the provider correlates cross-tenant data to prevent or at least detect such exploitation.

In some embodiments, the computing system 400 includes a cloud control plane 710 application program interface (API) 712 which is configured to perform respective resource management operations on behalf of multiple tenants 414 of the cloud. Such resource management operations may initially include, e.g., accounting or health monitoring, but can be enhanced or expanded by cybersecurity risk mitigation steps which utilize the cloud control plane API 712 to access data from multiple tenants, which is then correlated 714 to search for a relinquishment that has corresponding suspect activity.

In some embodiments, the digital memory 112 is configured by containing first tenant data 118 that is not within any authorized visibility scope 716 of the second tenant in the cloud architecture. The digital memory 112 is also configured by containing second tenant data 118 that is not within any authorized visibility scope 716 of the first tenant in the cloud architecture. The system 400 is configured to utilize 1048 the first tenant data and the second tenant data to mitigate 816 a cybersecurity risk 308 to the first tenant that is posed by the suspect activity of the second tenant.

In some embodiments, the network navigation data structure 402 includes at least one of the following: a CNAME domain name system record 602, an ALIAS domain name system record 608, or a PTR domain name system record 610.

In some embodiments, the network navigation target 406 includes at least one of the following: a web application 508, a software-as-a-service 510 user interface 512, a mobile application 514 backend service 516, a website 504, a web portal 518, a storage account 520, a digital key vault 522, a representational state transfer (REST) 524 application program interface 526, a resource 528 identified in a domain name record 530, or a resource 528 which previously resided, or currently resides, at a static IP address 506.

Other system embodiments are also described herein, either directly or derivable as system versions of described processes or configured media, duly informed by the extensive discussion herein of computing hardware.

Although specific dangling navigational data structure risk mitigation architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different security controls, technical features, mechanisms, access controls, operational sequences, data structures, data correlations, or other functionalities for instance, and may otherwise depart from the examples provided herein.

Processes (a.k.a. Methods)

Figure 8:
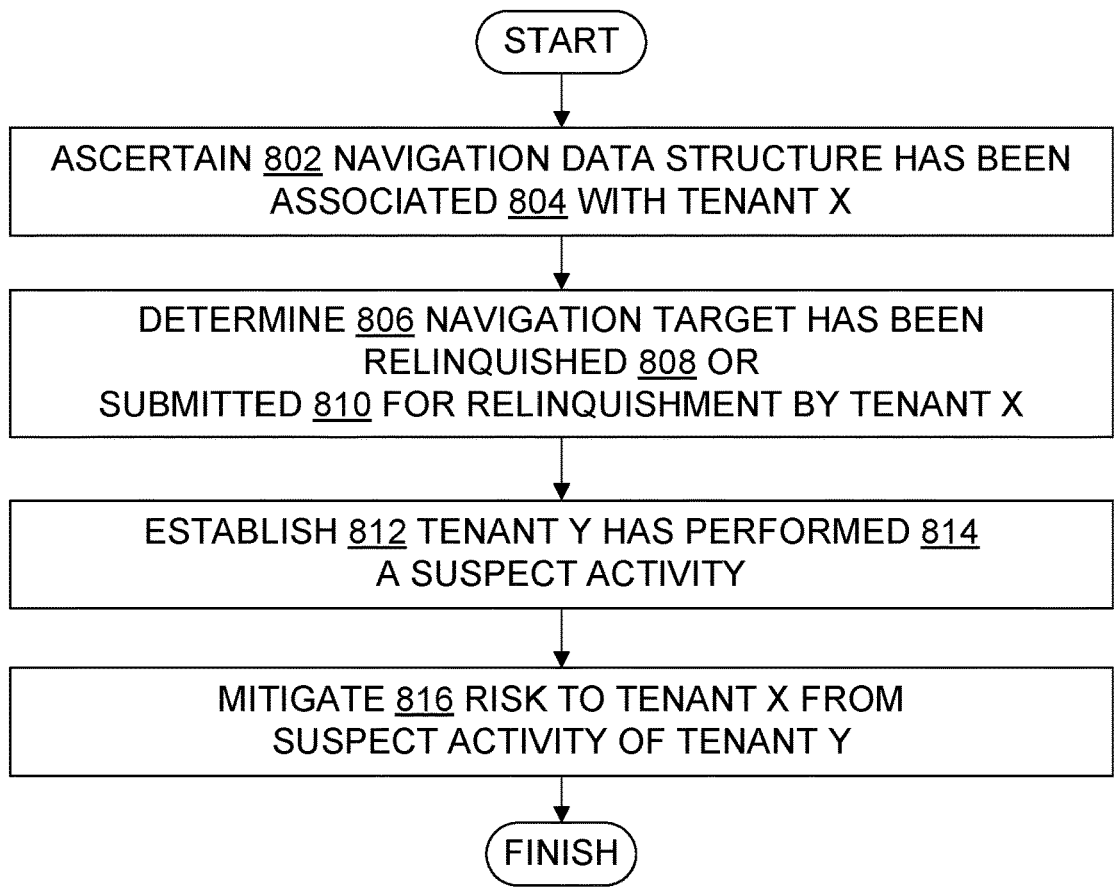
FIGS. 8 and 9 are flowcharts illustrating steps in some methods for mitigating cybersecurity risk from dangling navigational structures.
Figure 9:
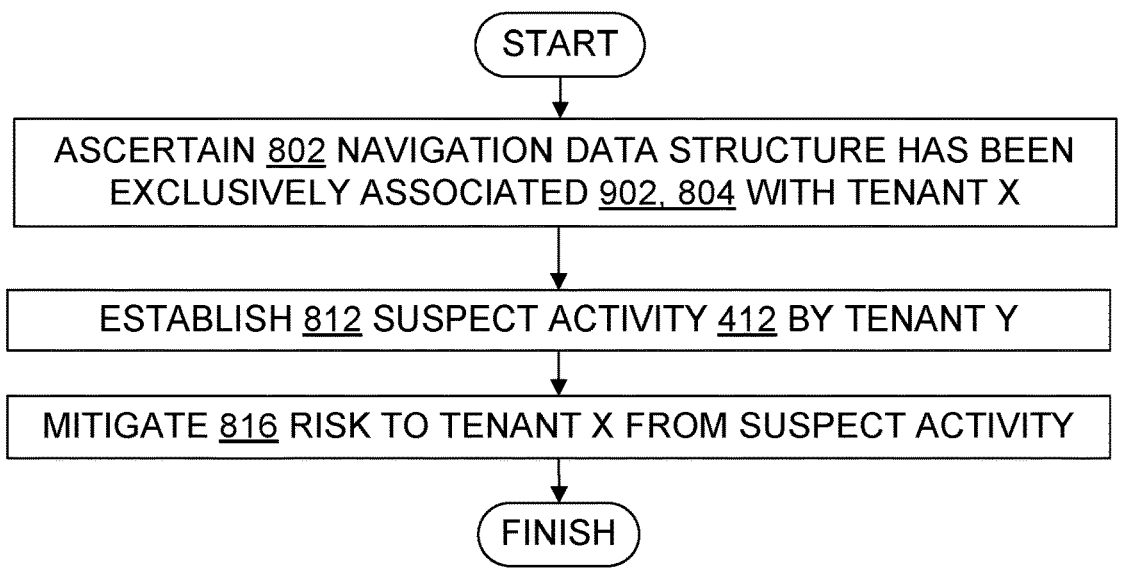
Figure 10:
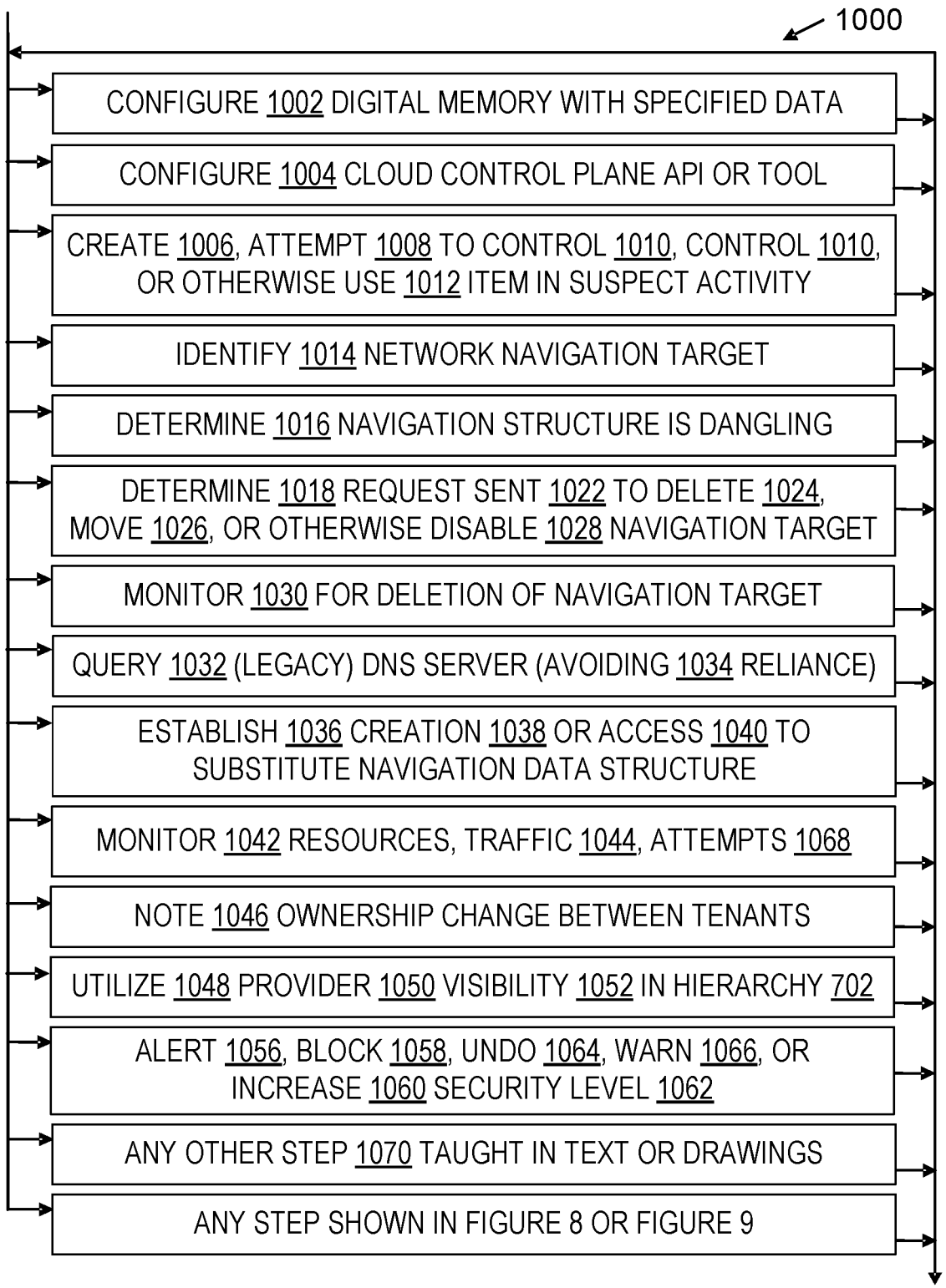
FIG. 10 is a flowchart further illustrating steps in some methods for mitigating cybersecurity risk from dangling navigational structures.

FIGS. 8 and 9 illustrate method families 800, 900 that may be performed or assisted by an enhanced system, such as system 400 or another risk mitigation functionality enhanced system as taught herein. FIG. 10 further illustrates risk mitigation methods (which may also be referred to as "processes" in the legal sense of that word) that are suitable for use during operation of a system which has innovative functionality taught herein. FIG. 10 includes some refinements, supplements, or contextual actions for steps shown in FIGS. 8 and 9. FIG. 10 also incorporates steps shown in FIG. 8 or 9.

Technical processes shown in the Figures or otherwise disclosed will be performed automatically, e.g., by an enhanced security infrastructure or vulnerability scanner, unless otherwise indicated. Some related processes may also be performed in part automatically and in part manually to the extent action by a human administrator or other human person is implicated, e.g., in some embodiments a human developer may manually choose a target 406 for deletion 1024, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 8 through 10. Steps may be performed serially, in a partially overlapping manner, or fully in parallel. In particular, the order in which flowchart 800, 900, or 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for mitigating cybersecurity risk 308 from dangling network navigation data structures in an architecture which has a provider-tenant-user hierarchy 702, including the following steps: ascertaining 802 that a network navigation data structure has been associated with a first tenant of the architecture, the network navigation data structure having a target identifier which identifies a network navigation target; determining 806 that the network navigation target has been relinquished 808 by the first tenant or has been submitted 810 for relinquishment by the first tenant; establishing 812 that a second tenant of the architecture has performed 814 a suspect activity 412 which includes creating, attempting to control, controlling, or otherwise using at least one of the following: the network navigation data structure, any data structure which contains the target identifier, or a substitute target which is identified by the target identifier; and mitigating 816 a cybersecurity risk to the first tenant that is posed by the suspect activity of the second tenant.

In some embodiments, the method is further characterized in at least one of the following ways: the determining 806 includes determining 1016 that the network navigation data structure is dangling 612 (e.g., a website hosted at a custom domain name is no longer there, or a website that was at a static IP is no longer there); the determining 806 includes determining 1018 that a request 532 has been sent by the first tenant to delete 1024 or move 1026 or otherwise disable 1028 the network navigation target (e.g., a user wants to delete or move a website that is currently at a custom domain name or static IP); the determining 806 includes monitoring 1030 for a deletion 1024 of the network navigation target (e.g., detect delete operations of App Service resources); or the establishing 812 includes establishing 1036 that the second tenant has created 1038 or accessed 1040 a substitute network navigation data structure 614 which identifies the network navigation target (e.g., a different tenant created or accessed a copy of the first tenant's CNAME record). In particular, in some embodiments the establishing 812 occurs in response to determining 1018 that the first tenant has authorized deletion 1024 of the target.

In some embodiments, the mitigating 816 includes at least one of the following: alerting 1056 the first tenant, including identifying the suspect activity to the first tenant; alerting 1056 the first tenant based on the suspect activity, without identifying the second tenant to the first tenant; at least partially blocking 1058 the suspect activity by the second tenant; at least partially undoing 1064 the suspect activity by the second tenant; warning 1066 a user who connects to the network navigation target; or warning 1066 a user who attempts to connect to the network navigation target.

As an example, some embodiments alert 1056 the first tenant, or block 1058 the second tenant, or do both, when the second tenant tries to create a website 504 with the same custom domain name or static IP that was previously used by the first tenant.

In some embodiments, the establishing 812 includes at least one of the following: querying 1032 a domain name server 616 to find out whether any record 530 is present that identifies 1014 the network navigation target; monitoring 1042 for creation of a resource 528, by any tenant other than the first tenant, which is identified 1014 by the target identifier; monitoring 1042 traffic 1044 to the network navigation target by any tenant other than the first tenant; monitoring 1042 for an attempt 1068 by any tenant other than the first tenant to obtain access using the target identifier; or monitoring 1042 for an attempt 1068 by any tenant other than the first tenant to provide a user with access using the target identifier.

For example, querying 1032 may include querying 1032 a domain name server 616 to find out whether there is a CNAME record 602, ALIAS record 608, or PTR record 610 for one tenant that includes a custom domain name 624 or a static IP 506 that was previously used by another tenant. More generally, some embodiments use a polling approach (e.g., DNS queries 1032), some use an event-driven approach (e.g., monitoring 1042 for triggers that fire when a website is deleted), and some use both approaches.

As another example, monitoring 1042 for creation of a resource may include continuously monitoring the cloud API calls for creations of new App Service resources with the name of the original resource 406 of the first tenant.

As for monitoring 1042, in some embodiments the provider 1050 has visibility to HTTP traffic (which includes HTTPS traffic for present purposes), e.g., App Service traffic, which can be utilized to determine whether a website is accessed via a custom domain. Some embodiments continuously monitor App Service or similar HTTP traffic for requests to a new resource with the original owner's domain name.

In some embodiments, the establishing 812 is performed without relying 1034 on any alert triggered directly by an operation of a domain name system (DNS) server 616. This allows performance of the method using queries 1032 to legacy DNS servers; it does not depend on visibility into the operations of the DNS server.

In some embodiments, the method includes ascertaining 802 that the first tenant had exclusive use 902 of the target identifier within the architecture, and establishing 812 that the second tenant subsequently has used 814 or is attempting 814 to use the target identifier in the architecture.

In some embodiments, the mitigating 816 includes at least one of the following: mitigating the cybersecurity risk when the network navigation target resides behind a load balancer 534, or mitigating the cybersecurity risk when the network navigation target resides behind a proxy 536. This contrasts with some other approaches, which have visibility only to the resources that they protect; that limited visibility inhibits or prevents detection of exploits in these scenarios.

In some embodiments, monitoring resource creation or deletion is not the way (or not the only way) to tell that a resource changed tenants. Another way is to check resource ID, resource owner, customer ID, tenant ID, or another ownership field 720.

In some embodiments, the establishing 812 includes at least one of the following: establishing that a network navigation data structure 402 ownership 718 field 720 indicates an ownership change 722 from the first tenant to another tenant, or establishing that a network navigation target 406 ownership 718 field 720 indicates an ownership change 722 from the first tenant to another tenant.

In some embodiments, the establishing 812 includes at least one of the following: utilizing 1048 a cloud management API 724 routine 726 which is not published 728 to any tenants of the cloud, utilizing 1048 a cloud management API 724 which denies 732 access 730 to users other than cloud service provider admins 734, utilizing 1048 a cross-tenant management API 736, or utilizing 1048 a cross-tenant web activity data 302 correlation 714.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as risk mitigation software 408, cross-tenant data 302, cross-tenant risk mitigation tools 304, and lists or other specifiers of suspect activity 412, in the form of data 118 and instructions 116, read from a removable storage medium 114 and/or another source such as a network connection, to form a configured storage medium. The configured storage medium 112 is capable of causing a computer system 102 to perform technical process steps for mitigating risk from dangling network navigation data structures, as disclosed herein. The Figures thus help illustrate configured storage media embodiments and process (a.k.a. method) embodiments, as well as system and process embodiments. In particular, any of the process steps illustrated in FIGS. 8 through 10, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a cloud computing system to perform a method for mitigating cybersecurity risk from dangling network navigation data structures in a cloud architecture which has a provider-tenant-user hierarchy. This method includes: ascertaining 802 that a network navigation data structure has been associated exclusively 902 with a first tenant of the cloud architecture, the network navigation data structure having a target identifier which identifies 1014 a network navigation target in the cloud architecture; establishing 812 that a second tenant of the cloud architecture subsequently performed 814 a suspect activity 412 which includes using 1012 the target identifier in the cloud architecture or attempting 1008 to use the target identifier in the cloud architecture, or both; and mitigating 816 a cybersecurity risk 308 to the first tenant that is posed by the suspect activity of the second tenant.

In some embodiments, the target identifier includes a domain name 622, and the suspect activity 412 includes use of a substitute website 502, 504 that is identified by the target identifier. In particular, the domain name 622 may be a custom domain name 624 or another subdomain.

In some embodiments, the method further includes alerting 1056 the first tenant in response to determining 1016 that the network navigation data structure is dangling 612.

In some embodiments, the method includes at least three of the following operations: determining 1018 that a request has been sent by the first tenant to delete or move or otherwise disable the network navigation target, monitoring 1030, 1042 for a deletion of the network navigation target, establishing 812, 1036 that the second tenant has created or accessed a substitute network navigation data structure which identifies the network navigation target, querying 1032 a domain name server to find out whether any record is present that identifies the network navigation target, monitoring 1042 for creation 1038 of a resource (by any tenant other than the first tenant) which is identified by the target identifier, monitoring 1042 traffic to the network navigation target by any tenant other than the first tenant, monitoring 1042 for an attempt by any tenant other than the first tenant to obtain access using the target identifier, or monitoring 1042 for an attempt by any tenant other than the first tenant to provide a user with access using the target identifier. Some embodiments include at least four of the listed operations, and some include at least five of the operations.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Dangling domains pose a security threat in web security. This threat happens, for example, when a resource name that is bound to a DNS record can be re-used without the control or permission of the original resource owner. This may involve dangling CNAME records, e.g., when a CNAME record is mapped to a resource (such as a web application) in an environment provided by a cloud provider or other service provider. If the resource is deleted, but the CNAME record isn't removed, a malicious actor can create a new resource with the name of the original resource and impersonate the original resource.

As an example, suppose Company A (Contoso) creates a website in an Azure® App Service environment (mark of Microsoft Corporation). This website is meant to be used for a limited time campaign. Assume the App Service resource name is "site1". Azure® resource management will automatically assign this customer a subdomain under azurewebsites.net, namely, "site1.azurewebsites.net". Assume the company wants this website to be accessible using the company's own primary domain ("contoso.com"), at the URL "campaign.contoso.com". Accordingly, the company creates a CNAME record on their DNS server that maps "campaign.contoso.com" to "site1.azurewebsites.net".

When the campaign is over, the company deletes the Azure® App Service resource. However, the company does not remove the CNAME record from their DNS server.

Now a malicious actor can create a new Azure® App Service resource which is also named "site1" but need not have the same content as the original site1 website. This will work because the resource is available. Because the CNAME record still exists, customers that browse to campaign.contoso.com will reach the malicious substitute website. If the substitute website seems legitimate, significant damage can happen, since the customers might trust that website.

Some embodiments mitigate the risks of dangling DNS scenarios like these, not only for Azure® App Service resources but also in other computing environments. Risks may be mitigated for any web hosting service. In particular, some embodiments detect when a DNS record becomes dangling, some detect when such a dangling record is maliciously used, and some do both.

Some embodiments in some scenarios use cloud provider visibility in at least two aspects, one aspect being provider visibility into Azure® API calls or into corresponding calls in environments other than Azure® environments, and another aspect being provider visibility into Azure® App Service HTTP traffic or similar traffic in other environments (mark of Microsoft Corporation).

In these examples, a first stage involves detecting when a DNS record 530 becomes a dangled record 612. The cloud provider has visibility into Azure® Resource Manager API 724 calls or similar provider-level resource management tools 738. This API 724 is part of a control plane 710 API 712. Operations such as the creation, deletion, or modification of cloud resources 528 are performed through this API. Therefore, with visibility into those API calls a provider 1050 can detect delete operations aimed at App Service resources. Since the provider has visibility to the HTTP traffic 1044 of App Service or its counterpart, the provider can also establish whether this website is accessed via a custom domain (in the example above, the custom domain is "campaign.contoso.com").

After the provider detects the deletion operation, it may actively query 1032 this custom domain by making a DNS query, and examine a resulting CNAME record 602. If the DNS record still maps to the App Service resource or counterpart ("site1.azurewebsites.net" in the example above) then the risk mitigation functionality recognizes that this domain is dangling, and take further action such as firing an alert 740 to the customer who owns the custom domain.

In these examples, a second stage involves detecting exploitation of dangling DNS record. After detecting the dangling DNS record in the first stage, the provider may continuously monitor the resource management calls for creations of new resources with the name of the original resource ("site1" in the example above). One of skill will acknowledge that such creation does not necessarily indicate an exploitation, since the creation might be a legitimate coincidence. Therefore, the provider may also continuously monitor traffic for requests to this new resource with the original owner domain name. If such traffic is seen, the provider's risk mitigation functionality may conclude that users are actively browsing to a non-genuine website, and fire an alert to the original resource owner.

This approach also mitigates risk involving resources that are behind load balancers 534 or proxies 536 or both. Other security solutions have visibility only to the resources that they are meant to protect, which isn't enough in this scenario.

More generally, a system's usage of teachings herein may be apparent through review of the system's behavior. To check for such usage, an investigator could create a new resource and assign a custom domain using CNAME record to the resource. Then delete the resource. Then create another resource with the same name under a different account (e.g., different tenant). Then access the new resource using the custom domain. If a security alert is triggered by the access, teachings herein have likely been implemented in the system. Of course, some teachings may still be implemented without this particular behavior test being satisfied.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as monitoring 1042 network traffic 1044, determining 1016 when a network navigation data structure 402 is dangling 612, tracking 1042 the creation 1006 or deletion 1024 of digital resources 528, and blocking 1058 suspect activity 412 by a cloud tenant 414, which are each an activity deeply rooted in computing technology. Some of the technical mechanisms discussed include, e.g., DNS servers 616, static IP addresses 506, CNAME records 602, ALIAS record 608, risk mitigation software 408, and interfaces 418. Some of the technical effects discussed include, e.g., detection of dangling navigation data structures 612, correlation 714 of activities by different cloud tenants 414, and alerts or blocks when activity 412 by one tenant poses a risk 308 to a different tenant due to a dangled navigation data structure. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as change, context, ownership, privacy, or safety may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively detect and mitigate risks from dangled navigation data structures. Other configured storage media, systems, and processes involving change, context, ownership, privacy, or safety are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP(S): hypertext transfer protocol (secure)
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
SIEM: security information and event management; also refers to tools which provide security information and event management
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
USB: universal serial bus
VM: virtual machine
WAN: wide area network Note Regarding Hyperlinks Portions of this disclosure contain URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, "risk" refers to a potential for loss or harm. "Risk" may also be defined as a likelihood of loss or harm multiplied by the impact if the loss or harm actually occurs.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" (or "admin") is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Risk "mitigation" means, e.g., performing one or more of the following in conjunction with, or as a precondition of, or in response to, a request or other attempt to access an asset or other resource: alerting, altering, auditing, authenticating, authorizing, blocking, delaying, invoking a security control, limiting, managing, moving, logging, reconfiguring, reporting, restricting, securing, or another operation taught herein. Mitigation is performed computationally, e.g., not by operation of law or by persuasive oratory.

"Misuse" of an asset or other resource includes any improper or unauthorized use, including in particular any uses that violate the confidentiality, integrity, availability, or privacy of data.

"Secured" means only that some security is provided, not that the effectiveness of the security is guaranteed.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Risk mitigation operations such as ascertaining 802 navigation structure associations 804, 902, determining 806 relinquishment 808 or 810 status, monitoring 1042 resources 528, monitoring 1042 traffic 1044, digitally alerting 1056, blocking 1058 digital access, and many other operations discussed herein, are understood to be inherently digital. A human mind cannot interface directly with a CPU or other processor, or with RAM or other digital storage, to read and write the necessary data to perform the risk mitigation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, alerting, ascertaining, associating, blocking, configuring, controlling, creating, deleting, determining, disabling, establishing, identifying, increasing, mitigating, monitoring, moving, noting, performing, querying, relinquishing, submitting, undoing, warning (and accesses, accessed, alerts, alerted, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of an enhanced system 400
106 peripherals
108 network generally, including, e.g., LANs, WANs, software-defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or nonvolatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
300 enhanced operating environment, also referred to as an enhanced computing environment, e.g., an environment 100 enhanced with any aspect of risk mitigation first taught herein
302 cross-tenant data, e.g., data 118 from two or more tenants or other provider customers which, when viewed as a whole, indicates a risk to one tenant due to activity of another tenant
304 cross-tenant security tools, e.g., any security tool 122 enhanced to obtain, recognize, or leverage cross-tenant data
306 mitigation of a risk arising from a dangling network navigation structure, e.g., mitigation performed by risk mitigation software 408 or mitigation performed during any of steps 816, 1056, 1058, 1064, 1066, 1060
308 risk arising from a dangling network navigation, e.g., a reputational, financial, legal, or other risk due to a substitute website or other substitute target 502
400 enhanced system, e.g., a system 102 enhanced with at least one of the following: cross-tenant security tools 304, risk mitigation software 408, or another functionality first taught herein, or which computationally performs a method according to FIG. 10
402 navigation data structure; also referred to as "navigational data structure" or "network navigation data structure", e.g., a DNS record or a static IP address or a data structure which enables, uses, or publishes a target identifier 404

404 target identifier, e.g., a URL, domain name, custom domain name, or IP address (IPv4 or IPv6)

406 target; also referred to as "network navigation target", e.g., any network destination or other networked resource identified by a target identifier 404

408 risk mitigation software, e.g., software which computationally performs a method according to FIG. 10 or otherwise executes risk mitigation steps first taught herein 410 relinquishment, e.g., deletion, abandonment, or other indication that a resource is no longer in active use 412 suspect activity, e.g., activity making unauthorized use of a dangling navigation data structure or creating risk 308 to a previous owner of a target (possibly since relinquished) that was identified by the dangling navigation data structure 414 tenant of a cloud or other customer organization or institution or agency receiving services from a cloud service provider or an internet service provider; the entity in a position directly beneath the provider in a hierarchy of decreasing visibilities that has the provider at the root and end users at the leaves 416 a Service Level Agreement (SLA), regulatory requirement, legal requirement, service contract, or other authorization of risk mitigations 306 performed or used by a provider 1050

418 interface to a system; may include, e.g., shells, graphical or other user interfaces, network addresses, APIs, network interface cards, ports 502 substitute target, e.g., a website or other resource substituted by one tenant in place of (or in front of) an original resource of another tenant; the original resource and the substitute resource 502 are each identified by the same target identifier 404, at least so far as an end user is concerned 504 website 506 static IP address, as opposed to dynamically assigned IP address 508 web application, e.g., a program that uses browsers and communicates over a network, especially the internet 510 software-as-a-service offering, or interface thereto 512 user interface generally 514 mobile application, e.g., program designed to run on a smartphone, tablet, or other portable device 516 backend service, e.g., software which supports a networked program but does not itself interact directly with end users 518 web portal, e.g., a platform that collects information from different sources into a single user interface 520 storage account, e.g., account which provides access to digital storage 522 digital key vault 522, e.g., digital mechanism for securely containing digital keys such as encryption keys, digital certificates, pass phrases, and for making them available to authorized users 524 representational state transfer (REST) protocol, or software implementing REST 526 REST application program interface (API)

528 digital resource generally 530 domain name record, e.g., CNAME record, ALIAS record, or PTR record 532 resource management request (digital)

534 load balancer in a network 536 proxy in a network

602 CNAME record

604 CNAME, e.g., domain name system canonical name for a destination target 606 domain name system (DNS)

608 ALIAS record; provides behavior similar to CNAME record

610 PTR record 612 dangling network navigation data structure, e.g., dangling DNS record 530; a record dangles when its target has been relinquished but the navigational functionality of the record remains viable; 612 also refers to the characteristic or action of such dangling 614 substitute network navigation data structure, e.g., substitute DNS record 530, which replaces or supplants a previous network navigation data structure that has the same target identifier 404

616 domain name server

618 ALIAS, e.g., domain name

620 PTR in a PTR record, e.g., static IP address 622 domain name generally 624 custom domain name 702 provider-tenant-user hierarchy or other hierarchy of visibilities in which a service provider has visibility into tenants or other customers to which the provider provides cloud or internet services, but the tenants or other customers do not have full visibility into each other's activities and resources 704 provider-level visibility of a provider in a hierarchy 702

706 data structure generally; data structures are digital artifacts usable in computing systems, not mental constructs 708 cloud; may also be referred to as "cloud environment" or "cloud computing environment"

710 cloud control plane, e.g., administrative consoles and interfaces for resource management in a cloud 712 cloud control plane API 714 correlation of cross-tenant data, e.g., recognition that a dangling structure used by one tenant is now being re-used by a different tenant, or that one tenant has substituted an intervening record for another tenant's navigational data structure, or that one tenant is using the same custom domain name that was or is being used by another tenant; 714 also refers to the action of correlating, that is, creating such a correlation across tenant visibility boundaries 716 authorized visibility scope of a tenant; normally limited to resources owned by that tenant and activities performed by or (with authority) on behalf of that tenant 718 ownership of a digital resource, e.g., the tenant who created the resource typically owns it 720 ownership field in a data structure that serves as or identifies a resource; may be implemented as a string, integer, subscriber ID, tenant ID, etc. that identifies a creator or other current owner 722 change of ownership from one tenant to another tenant 724 cloud management API 726 routine generally 728 unpublished routine, e.g., one normally used only by a provider and not readily accessible to tenants 730 access to a resource 732 access denial, access denier 734 admin; also referred to as "administrator"

736 cross-tenant management API, e.g., any API that creates or uses cross-tenant data 738 provider-level resource management tools generally, e.g., cross-tenant management API, unpublished routines, correlations of cross-tenant data, cloud control plane APIs 740 alert data structure or digital message 800 flowchart; 800 also refers to risk mitigation methods illustrated by or consistent with the FIG. 8 flowchart 802 ascertain that a navigation data structure has been associated with a tenant, e.g., by checking an ownership field; performed computationally 804 associate a data structure with a tenant, e.g., based on ownership or which entity has modify authorizations; may include scanning a log or other record of past activity; performed computationally 806 determine a target 406 has been relinquished, e.g., deleted or disabled; may be done, e.g., by searching for the target and not finding it, by tracking resource deletions, by garbage collection algorithms, by checking file system bits such as a delete bit, or by other computations 808 relinquishment, e.g., deletion, disablement, inactivation, or other computational action that indicates the relinquished item is no longer in service 810 submission for relinquishment, e.g., marking a bit or field indicating the memory taken by a resource can be reclaimed 812 establish that a tenant performed suspect activity, e.g., by tracking traffic or checking for records or log entries that normally occur as the result of such activity; performed computationally 814 computationally perform activity 816 mitigate risk; performed computationally; may include, e.g., (a) reporting an attack in a text message, email, generated-voice message, printout, alert, screen display, or other communication to an administrator or to security personnel or both, (b) triggering defense, e.g., by making a remote procedure call, or by sending a message, signal, or other digital action or communication to a tool such as an intrusion prevention system, firewall, or exfiltration prevention tool in order to request (as a possible action or as a command) that the triggered tool impose an access restriction, (c) imposing an access restriction, (d) locking an account, (e) blocking a location, e.g., an IP address or device or geolocation, (f) requiring additional authentication before permitting access, e.g., a one time password (OTP) sent by text message or email or generated by an authenticator app, or a biometric credential such as a fingerprint scan result, voiceprint, face recognition, or iris scan result, or a verified presence of a hardware token, or a digital token or certificate, or (g) taking any other computational action identified herein as application of a security enhancement or an attack defense 900 flowchart; 900 also refers to risk mitigation methods illustrated by or consistent with the FIG. 9 flowchart 902 associate a data structure exclusively with a single tenant, e.g., based on ownership or which entity has modify authorizations; may include scanning a log or other record of past activity; performed computationally 1000 flowchart; 1000 also refers to risk mitigation methods illustrated by or consistent with the FIG. 10 flowchart (which incorporates the steps of FIGS. 8 and 9)

1002 configure digital memory, e.g., by writing values into it 1004 configure a cloud control plane API or tool, e.g., by installing it, establishing authorization to use it, or invoking it 1006 computationally create a digital resource 1008 call a routine call or perform other computational steps directed at controlling a digital resource 1010 computationally control a digital resource, e.g., by configuring it, moving it, deleting it, creating it, setting values associated with it, or changing requirements for accessing it 1012 use a digital item, e.g., by performing any computation which relies on or refers to the item 1014 computationally identify a target, e.g., by including or setting an identifier that specifies the target's location in an environment 1016 computationally determine that a navigation structure is dangling, e.g., by determining that its target has been relinquished but the navigational functionality of the navigation structure remains viable 1018 computationally determine that a request has been sent, e.g., by scanning a log, monitoring traffic for the request, or locating the received request 1022 computationally send a request, e.g., in network traffic 1024 computationally delete an item 1026 computationally move an item to another location in a computing environment 1028 computationally disable previously available use of an item 1030 computationally monitor for deletion of a target, e.g., by scanning a log, monitoring traffic, or noting allocation status of the target 1032 computationally query a DNS server, e.g., using UDP on port 53, an nslookup tool, or a dig tool 1034 avoid reliance on visibility into a DNS server while computationally obtaining data about what records 530 the server contains 1036 computationally establish that a substitute navigation data structure has been created or accessed or both, e.g., by scanning a log, monitoring traffic, or locating the substitute navigation data structure in an environment 1038 computationally create a substitute navigation data structure 1040 computationally access a substitute navigation data structure 1042 computationally monitor a resource 528, or network traffic, or attempts to use or access a resource 528, or a mix thereof; may include packet inspection, log parsing, or other computational investigative steps 1044 network traffic 1046 computationally note an ownership change, e.g., by comparing ownership field values 1048 computationally utilize provider visibility, e.g., by obtaining or correlating cross-tenant data 1050 service provider, e.g., cloud service provider or internet service provider 1052 visibility, e.g., the set of all resources (including logs and traffic) which is visible to a particular entity in a given computing environment 1056 computationally send an alert 1058 computationally block access to a resource 1060 computationally increase authentication or authorization needed to control or otherwise access a resource 528

1062 authentication or authorization needed to control or otherwise access a resource 528; also referred to as the "security level" of the resource

1064 computationally undo (e.g., back out, reverse, nullify) one or more steps performed in a computing environment

1066 computationally send a warning; an alert may be considered a type of warning, but in general alerts are directed at people or computers or both, whereas warnings are directed at people

1068 computational attempt to read, write, create, or otherwise access a resource

1070 any step discussed in the present disclosure that has not been assigned some other reference numeral

CONCLUSION

In short, the teachings herein provide a variety of risk mitigation functionalities which operate in enhanced systems 400. Cybersecurity is enhanced, with particular attention to dangling DNS records. Technology 400, 1000 for risk 308 mitigation 306 detects 806 risky situations in which a domain name record 530 remains viable after the website 504, storage account 520, key vault 522, or other target 406 resource 528 the record 530 identified 1014 is not viable, due to actual 808 or impending 810 relinquishment 808. Such dangling records 612 create various risks 308 because substitute targets 502, such as fraudulent websites 504, may be installed without the knowledge of the original target's owner 414. By obtaining 802, 806, 812 and correlating data 302 from multiple tenants 414, a cloud service provider 1050 detects 1016 dangling structures 612 and any attempts 1008 to exploit 814 them 612. Dangling records 612 may specify a custom domain name 624, for example, or a static IP address 506 that can be misused. In response, the provider's security infrastructure 304, 400 can alert 1056 the original target's owner 414, block 1058 the attempted exploit 412, or otherwise mitigate 816 the risks 308. Traffic 1044 monitoring 1042, control plane API 712 invocations, and domain name server 616 queries 1032 may be employed 802, 806, 812 by the security infrastructure 304, 400 to detect 1030, 1018 resource 528 deletion 1024, resource 528 creation 1006, and resource 528 access 1006, 1010 attempts 1008 that correspond 714 with vulnerable records 612 or with suspect activity 412 involving them 612.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 through 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/ or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to mitigate cybersecurity risk from dangling network navigation data structures by using provider-level visibility in a cloud architecture which has a provider-tenant-user hierarchy, the system comprising:
   a digital memory;
   a processor in operable communication with the digital memory, the processor configured to perform cybersecurity risk mitigation steps including automatically
   (a) ascertaining that a network navigation data structure has been associated with a first tenant of the cloud architecture, the first tenant having multiple users in the provider-tenant-user hierarchy, the network navigation data structure having a target identifier which identifies a network navigation target, wherein the target identifier comprises at least one of: a domain name, or an IP address, and wherein the network navigation data structure comprises at least one of: a CNAME domain name system record, an ALIAS domain name system record, a PTR domain name system record, a domain name system record which includes the target identifier, or a static IP record,
   (b) determining that the network navigation target has been relinquished by the first tenant or has been submitted for relinquishment by the first tenant, but the navigational functionality of the navigation structure remains viable, and
   (c) establishing that a second tenant of the cloud architecture has performed a suspect activity which includes creating, attempting to control, controlling, or otherwise using at least one of the following: the network navigation data structure, any data structure which contains the target identifier, or a substitute target which is identified by the target identifier.

2. The computing system of claim 1, wherein the computing system comprises a cloud control plane application program interface (API) which is configured to perform respective resource management operations on behalf of multiple tenants of the cloud, and wherein the cybersecurity risk mitigation steps utilize the cloud control plane API to access data.

3. The computing system of claim 1, wherein:
   the digital memory is configured by containing first tenant data that is not within any authorized visibility scope of the second tenant in the cloud architecture;
   the digital memory is configured by containing second tenant data that is not within any authorized visibility scope of the first tenant in the cloud architecture; and
   the system is configured to utilize the first tenant data and the second tenant data to mitigate a cybersecurity risk to the first tenant that is posed by the suspect activity of the second tenant.

4. The computing system of claim 1, wherein the network navigation data structure comprises at least one of the following:
   a CNAME domain name system record;
   an ALIAS domain name system record; or
   a PTR domain name system record.

5. The computing system of claim 1, wherein the network navigation target comprises at least one of the following:
   a web application;
   a software-as-a-service user interface;
   a mobile application backend service;
   a website;
   a web portal;
   a storage account;
   a digital key vault;

a representational state transfer application program interface;

a resource identified in a domain name record; or a resource which previously resided, or currently resides, at a static IP address.

6. A method for mitigating cybersecurity risk from dangling network navigation data structures in an architecture which has a provider-tenant-user hierarchy, the method comprising:

ascertaining that a network navigation data structure has been associated with a first tenant of the architecture, the first tenant having multiple users in the provider-tenant-user hierarchy, the network navigation data structure having a target identifier which identifies a network navigation target, wherein the target identifier comprises at least one of: a domain name, or an IP address, and wherein the network navigation data structure comprises at least one of: a CNAME domain name system record, an ALIAS domain name system record, a PTR domain name system record, a domain name system record which includes the target identifier, or a static IP record;

determining that the network navigation target has been relinquished by the first tenant or has been submitted for relinquishment by the first tenant, but the navigational functionality of the navigation structure remains viable;

establishing that a second tenant of the architecture has performed a suspect activity which includes creating, attempting to control, controlling, or otherwise using at least one of the following: the network navigation data structure, any data structure which contains the target identifier, or a substitute target which is identified by the target identifier; and mitigating a cybersecurity risk to the first tenant that is posed by the suspect activity of the second tenant.

7. The method of claim 6, further characterized in at least one of the following ways:

the determining includes determining that the network navigation data structure is dangling;

the determining includes determining that a request has been sent by the first tenant to delete or move or otherwise disable the network navigation target;

the determining includes monitoring for a deletion of the network navigation target; or the establishing includes establishing that the second tenant has created or accessed a substitute network navigation data structure which identifies the network navigation target.

8. The method of claim 6, wherein the mitigating comprises at least one of the following:

alerting the first tenant, including identifying the suspect activity to the first tenant;

alerting the first tenant based on the suspect activity, without identifying the second tenant to the first tenant;

at least partially blocking the suspect activity by the second tenant;

at least partially undoing the suspect activity by the second tenant;

warning a user who connects to the network navigation target; or warning a user who attempts to connect to the network navigation target.

9. The method of claim 6, wherein the establishing comprises at least one of the following:

querying a domain name server to find out whether any record is present that identifies the network navigation target;

monitoring for creation of a resource, by any tenant other than the first tenant, which is identified by the target identifier;

monitoring traffic to the network navigation target by any tenant other than the first tenant;

monitoring for an attempt by any tenant other than the first tenant to obtain access using the target identifier; or monitoring for an attempt by any tenant other than the first tenant to provide a user with access using the target identifier.

10. The method of claim 6, wherein the establishing is performed without relying on any alert triggered directly by an operation of a domain name system (DNS) server, thereby allowing performance of the method using queries to legacy DNS servers.

11. The method of claim 6, wherein the method includes ascertaining that the first tenant had exclusive use of the target identifier within the architecture, and establishing that the second tenant subsequently has used or is attempting to use the target identifier in the architecture.

12. The method of claim 6, wherein the mitigating comprises at least one of the following:

mitigating the cybersecurity risk when the network navigation target resides behind a load balancer; or mitigating the cybersecurity risk when the network navigation target resides behind a proxy.

13. The method of claim 6, wherein the establishing comprises at least one of the following:

establishing that a network navigation data structure ownership field indicates an ownership change from the first tenant to another tenant; or establishing that a network navigation target ownership field indicates an ownership change from the first tenant to another tenant.

14. The method of claim 6, wherein the establishing comprises at least one of the following:

utilizing a cloud management API routine which is not published to any tenants of the cloud;

utilizing a cloud management API which denies access to users other than cloud service provider admins;

utilizing a cross-tenant management API; or utilizing a cross-tenant web activity data correlation.

15. The method of claim 6, wherein the establishing occurs in response to determining that the first tenant has authorized deletion of the target.

16. A computer-readable storage device configured with data and instructions which upon execution by a processor cause a cloud computing system to perform a method for mitigating cybersecurity risk from dangling network navigation data structures in a cloud architecture which has a provider-tenant-user hierarchy, the method comprising:

ascertaining that a network navigation data structure has been associated exclusively with a first tenant of the cloud architecture, the first tenant having multiple users in the provider-tenant-user hierarchy, the network navigation data structure having a target identifier which identifies a network navigation target in the cloud architecture, wherein the target identifier comprises at least one of: a domain name, or an IP address, wherein the network navigation data structure comprises at least one of: a CNAME domain name system record, an ALIAS domain name system record, a PTR domain name system record, a domain name system record which includes the target identifier, or a static IP record;

determining that the network navigation target has been relinquished by the first tenant or has been submitted for relinquishment by the first tenant, but the navigational functionality of the navigation structure remains viable;

establishing that a second tenant of the cloud architecture subsequently performed a suspect activity which includes using the target identifier in the cloud architecture or attempting to use the target identifier in the cloud architecture, or both, the second tenant having multiple users in the provider-tenant-user hierarchy; and mitigating a cybersecurity risk to the first tenant that is posed by the suspect activity of the second tenant.

17. The storage device of claim 16, wherein the target identifier includes a domain name, and the suspect activity includes use of a substitute website that is identified by the target identifier.

18. The storage device of claim 16, wherein the method further comprises alerting the first tenant in response to determining that the network navigation data structure is dangling.

19. The storage device of claim 16, wherein the method further comprises at least three of the following operations:

determining that a request has been sent by the first tenant to delete or move or otherwise disable the network navigation target;

monitoring for a deletion of the network navigation target;

establishing that the second tenant has created or accessed a substitute network navigation data structure which identifies the network navigation target;

querying a domain name server to find out whether any record is present that identifies the network navigation target;

monitoring for creation of a resource, by any tenant other than the first tenant, which is identified by the target identifier;

monitoring traffic to the network navigation target by any tenant other than the first tenant;

monitoring for an attempt by any tenant other than the first tenant to obtain access using the target identifier; or monitoring for an attempt by any tenant other than the first tenant to provide a user with access using the target identifier.

20. The storage device of claim 19, wherein the method comprises at least four of the operations.

* * * * *